United States Patent
Jang et al.

(10) Patent No.: US 7,489,868 B2
(45) Date of Patent: Feb. 10, 2009

(54) APPARATUS FOR MEASURING OPTICAL BEAT INTERFERENCE NOISE IN SUBCARRIER MULTIPLE ACCESS OPTICAL NETWORK

(75) Inventors: Seung Hyun Jang, Jeju-si (KR); Chul Soo Lee, Daejeon (KR); Eui Suk Jung, Daejeon (KR); Byoung Whi Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 542 days.

(21) Appl. No.: 11/110,134

(22) Filed: Apr. 19, 2005

(65) Prior Publication Data

US 2006/0127092 A1 Jun. 15, 2006

(30) Foreign Application Priority Data

Dec. 10, 2004 (KR) .................. 10-2004-0104379

(51) Int. Cl.
*H04J 14/00* (2006.01)
(52) U.S. Cl. .................................... 398/70
(58) Field of Classification Search ............. 398/70–72, 398/76, 78
See application file for complete search history.

(56) References Cited

U.S. PATENT DOCUMENTS 6,417,942 B1* 7/2002 Seto et al. ................... 398/5

FOREIGN PATENT DOCUMENTS

GB 2294372 A 4/1996

OTHER PUBLICATIONS

S. Soerensen, "Optical Beat Noise Suppression . . . ", Journal of Lightwave Technology, vol. 18, No. 10, Oct. 2000 (pp. 1337-1347).

* cited by examiner

*Primary Examiner*—Quan-Zhen Wang
(74) *Attorney, Agent, or Firm*—Blakely, Sokoloff, Taylor & Zafman LLP

(57) ABSTRACT

An apparatus for measuring Optical Beat Interference (OBI) noise is applied to a central office in a Subcarrier Multiple Access (SCMA) optical network. The central office includes an optical receiver for converting an optical signal received through an optical fiber into an electrical signal. The OBI noise measurement apparatus includes a power divider, first and second filters, and a power measurement unit. The power divider divides the power of a signal output from the optical receiver into two signals. The first filter passes one of the two signals divided by the power divider in a low band of frequencies below a band of subcarrier signals. The second filter passes the other of the two signals divided by the power divider in a high band of frequencies above the band of subcarrier signals. The power measurement unit measures the power of each signal passed through the first and second filters.

6 Claims, 6 Drawing Sheets

APPARATUS FOR MEASURING OPTICAL BEAT INTERFERENCE NOISE IN SUBCARRIER MULTIPLE ACCESS OPTICAL NETWORK

RELATED APPLICATION

The present application is based on, and claims priority from, Korean Application Number 2004-104379, filed Dec. 10, 2004, the disclosure of which is incorporated by reference herein in its entirety.

BACKGROUND OF THE INVENTION

1. Field of the Invention

The present invention relates to an apparatus for measuring Optical Beat Interference (OBI) noise that is applied to a Central Office (CO) included in a Subcarrier Multiple Access (SCMA) optical network, and more particularly to an apparatus for measuring OBI noise in the SCMA optical network, wherein OBI noise in a signal output from an optical receiver of the central office in the optical network is measured in both a low band of frequencies below a band of subcarrier signals and a high band of frequencies above the band of subcarrier signals, thereby making it possible to quickly and correctly detect the occurrence of OBI noise and quickly and correctly measure the level of the OBI noise, regardless of which band the OBI noise occurs in.

2. Description of the Related Art

Optical networks have received a great deal of attention as next-generation subscriber access networks for the information age. A point-to-point optical network can provide a large amount of data to subscribers with high security. Despite this advantage, the point-to-point optical network has not yet been commercialized due to severe implementation costs.

One economical optical network is a point-to-multipoint optical network that allows a number of subscribers to share a single optical fiber and decreases network implementation costs per subscriber.

The point-to-multipoint optical network can be implemented using a Subcarrier Multiple Access (SCMA) scheme in which different subcarriers are allocated to optical signals of subscribers sharing a single optical fiber. In the SCMA scheme, a subscriber loads its information on a subcarrier allocated to the subscriber to transmit it, and the central office uses a band pass filter corresponding to the subscriber to pass a signal received from the subscriber to extract the information of the subscriber.

FIG. 1 is a schematic block diagram of a conventional point-to-point optical network.

As shown in FIG. 1, the conventional point-to-point optical network comprises a plurality of subscriber terminals 10-1 to 10-N, a plurality of optical fibers (OF), and a Central Office (CO) 20. The plurality of subscriber terminals 10-1 to 10-N include a plurality of optical transmitters 11-1 to 11-N for transmitting a plurality of optical signals, respectively. The plurality of optical fibers (OF) carry the plurality of optical signals transmitted from the plurality of optical transmitters 11-1 to 11-N, respectively. The Central Office (CO) 20 includes an optical receiver 21 for receiving the plurality of optical signals from the plurality of optical fibers (OF) through different inputs. Here, the subscriber terminals 10-1 to 10-N correspond to Subscriber Optical Network Terminals (ONTs) or Optical Network Units (ONUs), and the optical receiver 21 in the central office 20 corresponds to a telephone office Optical Line Terminal (OLT).

However, since it requires a number of optical fibers, the point-to-point optical network has high implementation costs, increasing costs per subscriber. A point-to-multipoint optical network as shown in FIG. 2 has been suggested to overcome this problem.

FIG. 2 is a schematic block diagram of a conventional point-to-multipoint optical network.

The conventional point-to-multipoint network shown in FIG. 2 is a network that is implemented by applying the SCMA scheme to the point-to-point optical network in order to allow a number of subscribers to share a single optical fiber.

As shown in FIG. 2, the conventional point-to-multipoint optical network comprises a plurality of subscriber terminals 30-1 to 30-N, a plurality of first optical fibers (OF1), an optical coupler 40, a second optical fiber (OF2), and a central office 50. The plurality of subscriber terminals 30-1 to 30-N include optical transmitters 31-1 to 31-N for transmitting a plurality of optical signals, respectively. The plurality of first optical fibers (OF1) carry the plurality of optical signals, transmitted from the plurality of optical transmitters 31-1 to 31-N, to the optical coupler 40. The optical coupler 40 combines the plurality of optical signals passed through respective ones of the plurality of first optical fibers (OF1) into a single optical signal. The second optical fiber (OF2) carries the optical signal output from the optical coupler 40 to the central office 50. The central office 50 includes an optical receiver 51 for receiving the optical signal passed through the second optical fiber (OF2) through a single input.

The plurality of subscriber terminals 30-1 to 30-N load their information on different subcarriers for transmission. The optical receiver 51 of the central office 50 discriminates and processes signals received from the subscriber terminals according to their subcarriers. Since the plurality of subscribers share the second optical fiber (OF2) based on the SCMA scheme, it is possible to decrease costs per subscriber, thereby achieving a low-cost optical network.

However, in the SCMA optical network, optical beat interference (OBI) occurs if the optical receiver 51 in the central office 50 simultaneously receives two or more optical signals. If OBI noise is present in the band of subcarrier signals, the OBI noise is a major factor decreasing Signal to Noise Ratio (SNR).

The central frequency of OBI noise corresponds to the difference between the central frequencies of two received optical signals, and the spectrum of the OBI noise has a form similar to that of the convolution of the spectrums of the two optical signals. Such OBI noise occurs in an optical receiver if the optical receiver simultaneously receives a large number of optical signals as in the SCMA optical network.

In other words, if a frequency corresponding to the difference between the central frequencies of two received optical signals is present in the band of subcarrier signals, OBI noise occurs in the band of subcarrier signals, reducing the signal to noise ratio. To guarantee QoS in the SCMA optical network, it is necessary to quickly detect the occurrence of OBI when the OBI occurs, so as to control a light source causing the OBI.

A conventional method for measuring OBI noise is described below.

FIG. 3 is a block diagram of an optical network in which a conventional Optical Beat Interference (OBI) measurement apparatus is provided.

As shown in FIG. 3, the optical network comprises a receiving station 1, a plurality of transmitting stations, and an optical coupler 4. The plurality of transmitting stations 2 transmit a plurality of optical signals to the receiving station 1 through the optical coupler 4. The receiving station 1 comprises an optical receiver 15, a plurality of filters ($f_1$ to f3) 8, a plurality of demodulators 9, and a conventional OBI noise measurement apparatus including an OBI noise filter 10 and a noise meter 11. The optical receiver 15 receives an optical signal from the optical coupler 4, and the plurality of filters 8 pass only corresponding subcarriers of the output signal of the optical receiver 15, respectively. The plurality of demodulators 9 demodulate signals output from the filters 8, respectively. The OBI noise filter 10 passes a specified band of frequencies of the output signal of the optical receiver 15 other than the subcarrier band. The noise meter 11 measures noise passed through the OBI noise filter 10.

In such an optical network including the conventional OBI noise measurement apparatus as shown in FIG. 3, the receiving station (corresponding to the central office) passes noise in a specified band of frequencies other than the subcarrier band through the noise filter 10, and uses the noise meter to continuously measure the power of noise passed through the noise filter 11. The conventional OBI noise measurement apparatus performs OBI noise measurement, based on a property of the noise filter that the output noise power of the filter is increased if Optical Beat Interference (OBI) noise occurs due to beating between two or more optical signals in an optical network, thereby affecting the band of subcarriers.

The conventional OBI measurement apparatus is described in detail in United Kingdom Patent Publication No. GB 2 294 372 A.

In another conventional OBI measurement method, the power of noise in a specified band of frequencies other than the band of subcarriers is measured in the same manner as in the OBI measurement method of FIG. 3, and the power of each subcarrier signal is also measured to determine OBI noise power relative to signal power, rather than absolute noise power, so as to operate light sources to operate under a condition maximizing the signal-to-noise power ratio.

However, the conventional OBI measurement apparatus and methods have the following problems.

The power of OBI noise is measured in a low frequency band below the subcarrier band or in a high frequency band above the subcarrier band, measurements of the power of OBI noise vary depending on whether OBI noise occurs in the low frequency band below the subcarrier band or in the high frequency band above the subcarrier band.

For example, in the case where two received optical signals have been modulated with a modulation index of 0.1 using two subcarrier signals of 2 GHz and 3 GHz, respectively, the difference between central frequencies of the two optical signals is 4 GHz, and the noise filter provided for measuring OBI noise passes a band of frequencies of 2 GHz or less, the power of OBI noise occurring in the band of frequencies of 2 GHz or less is lower than the power of OBI noise measured in a band of frequencies of 3 GHz or more.

In addition, in the case where two received optical signals have been modulated using two subcarrier signals of 2 GHz and 3 GHz, respectively, the difference between central frequencies of the two optical signals is 1 GHz, and the filter provided for measuring OBI noise passes a band of frequencies of 3 GHz or more, the power of OBI noise measured in a band of frequencies of 3 GHz or more is lower than the power of OBI noise occurring in a band of frequencies of 2 GHz or less.

This not only causes an OBI noise measurement error but also makes it difficult to quickly and correctly detect the occurrence of OBI noise and quickly and correctly measure the level of the OBI noise in the case where the OBI noise occurs in the subcarrier band or at a frequency near the subcarrier band.

SUMMARY OF THE INVENTION

Therefore, the present invention has been made in view of the above problems, and it is an object of the present invention to provide an apparatus for measuring Optical Beat Interference (OBI) noise in a Subcarrier Multiple Access (SCMA) optical network, wherein OBI noise in a signal output from an optical receiver in a Central Office (CO) in the SCMA optical network is measured in both a low band of frequencies below a band of subcarrier signals and a high band of frequencies above the band of subcarrier signals, thereby making it possible to quickly and correctly detect the occurrence of OBI noise and quickly and correctly measure the level of the OBI noise, regardless of which band the OBI noise occurs in.

In accordance with one aspect of the present invention, the above and other objects can be accomplished by the provision of an apparatus for measuring Optical Beat Interference (OBI) noise, the apparatus being applied to a central office included in a Subcarrier Multiple Access (SCMA) optical network, the central office including an optical receiver for converting an optical signal received through an optical fiber into an electrical signal, the apparatus comprising: a power divider for dividing the power of a signal output from the optical receiver into two signals; a first filter for passing one of the two signals divided by the power divider in a low band of frequencies below a band of subcarrier signals; a second filter for passing the other of the two signals divided by the power divider in a high band of frequencies above the band of subcarrier signals; and a power measurement unit for measuring power of each signal passed through the first and second filters.

Preferably, the OBI noise measurement apparatus further comprises a signal processor for measuring OBI noise level based on power values measured by the power measurement unit.

Preferably, the first filter includes at least one of a Band Pass Filter (BPF) and a Low Pass Filter (LPF), and the second filter includes at least one of a Band Pass Filter (BPF) and a High Pass Filter (HPF).

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
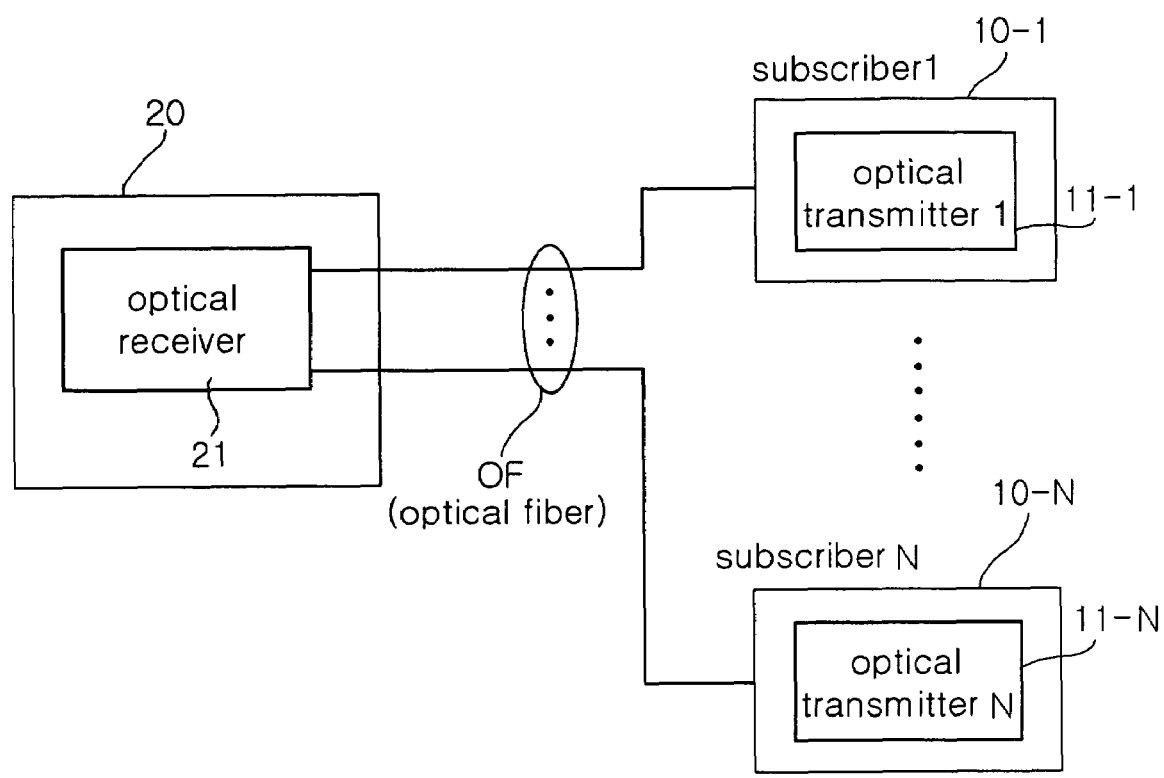
FIG. 1 is a schematic block diagram of a conventional point-to-point optical network.
Figure 2:
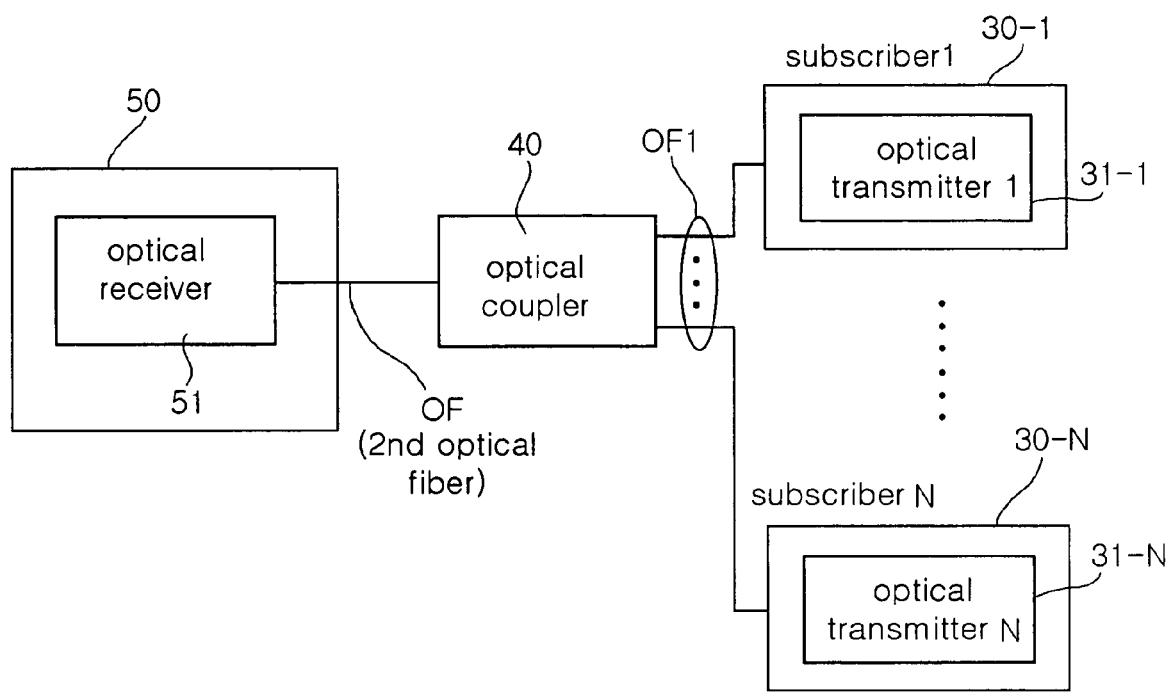
FIG. 2 is a schematic block diagram of a conventional point-to-multipoint optical network.
Figure 3:
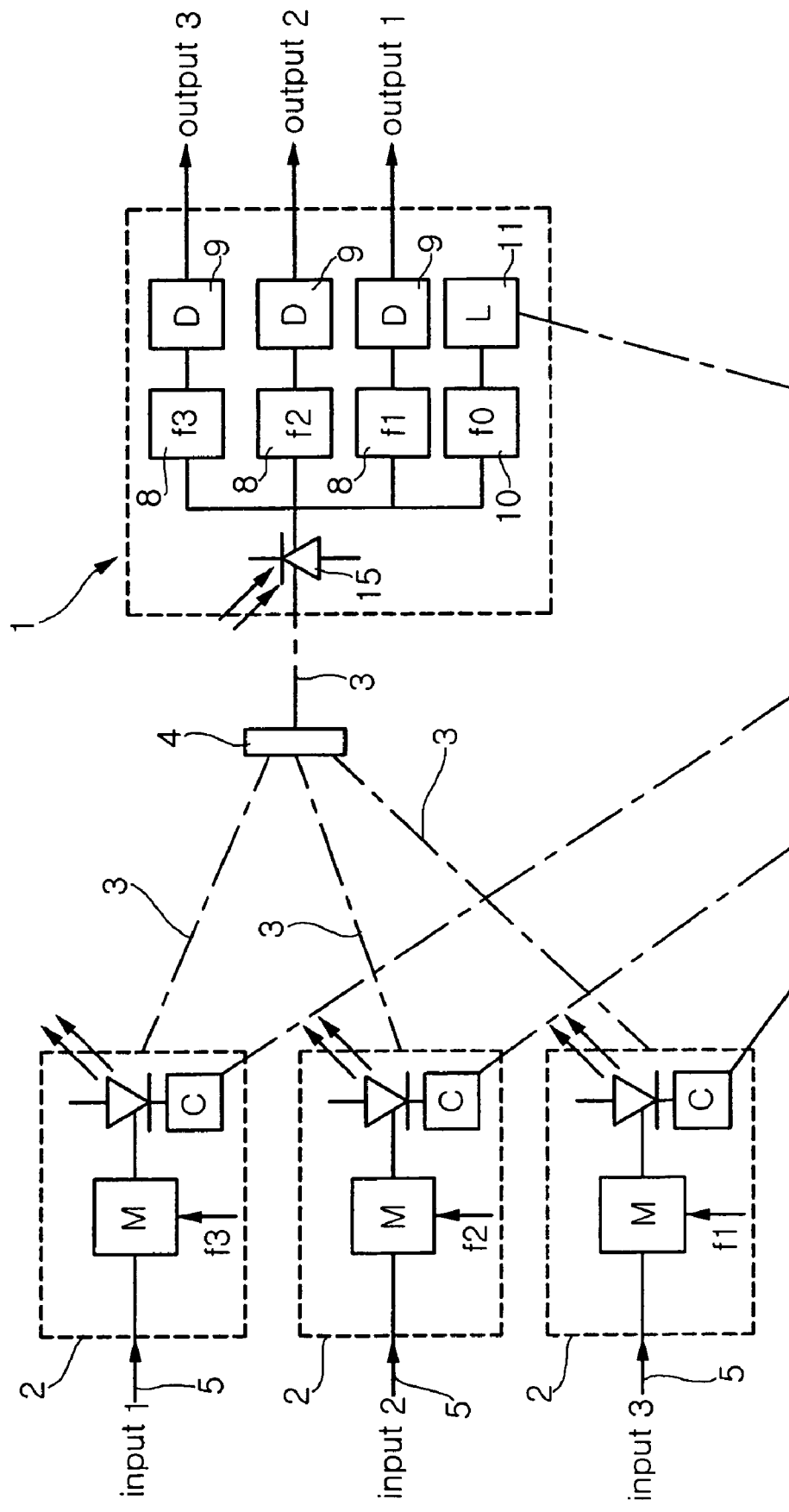
FIG. 3 is a block diagram of an optical network in which a conventional Optical Beat Interference (OBI) measurement apparatus is provided.

Now, preferred embodiments of the present invention will be described with reference to the accompanying drawings.

In the drawings, the same or similar elements are denoted by the same reference numerals even though they are depicted in different drawings.

An OBI noise measurement apparatus according to the present invention is included in a Subcarrier Multiple Access (SCMA) optical network, and is applied to a central office that includes an optical receiver for converting an optical signal received through an optical fiber into an electrical signal.

Figure 4:
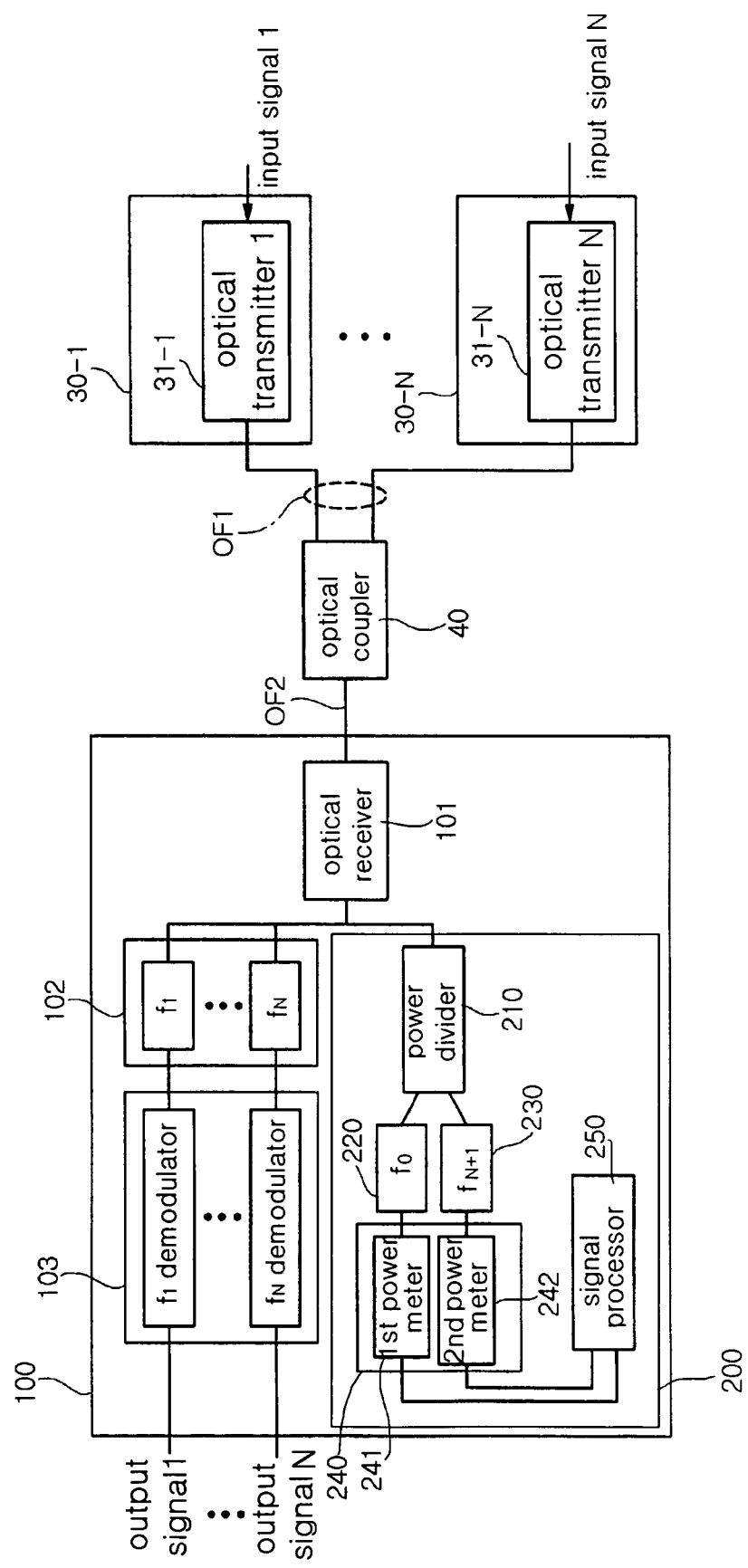
FIG. 4 is a block diagram of an optical network in which an OBI measurement apparatus according to the present invention is provided.

FIG. 4 is a block diagram of an optical network in which an Optical Beat Interference (OBI) measurement apparatus according to the present invention is provided. As shown in FIG. 4, the optical network comprises a central office 100, an optical coupler 40 connected with the central office 100 through a single optical fiber (OF2), and a plurality of subscriber terminals 30-1 to 30-N connected with the optical coupler 40 through respective ones of a plurality of optical fibers (OF1). The central office 100 includes an optical receiver 101, a plurality of subcarrier filters 102, a plurality of demodulators 103, and an OBI measurement apparatus 200 according to the present invention. The plurality of subscriber terminals 30-1 to 30-N includes a plurality of optical transmitters 31-1 to 31-N, respectively.

As shown in FIG. 4, the OBI measurement apparatus 200 according to the present invention comprises a power divider 210, a first filter 220, a second filter 230, and a power measurement unit 240. The power divider 210 divides the power of a signal output from the optical receiver 101 into two signals. The first filter 220 passes one of the two signals divided by the power divider 210 in a low band of frequencies below the band of subcarrier signals. The second filter 230 passes the other of the two divided signals in a band of frequencies higher than the band of subcarrier signals. The power measurement unit 240 measures the power of each signal passed through the first and second filters 220 and 230.

The first filter 220 may include at least one of a Band Pass Filter (BPF) and a Low Pass Filter (LPF), and the second filter 230 may include at least one of a Band Pass Filter (BPF) and a High Pass Filter (HPF).

For example, if subcarriers of a received signal are in a band of frequencies $f_1$ to $f_N$, the first filter 220 can be set to pass the received signal in a low band of frequencies $f_0$ below the subcarrier frequency $f_1$, and the second filter 230 can be set to pass the received signal in a high band of frequencies $f_N+1$ above the subcarrier frequency $f_N$.

The power measurement unit 240 includes a first power meter 241 for measuring each signal passed through the first filter 220, and a second power meter 242 for measuring each signal passed through the second filter 230.

The OBI noise measurement apparatus according to the present invention may further include a signal processor 250 for measuring OBI noise level on the basis of power values detected by the power measurement unit 240. For example, the signal processor 250 can be implemented so as to measure OBI noise level by adding power values measured by the first and second power meters 241 and 242. Alternatively, the signal processor 250 can be implemented so as to measure OBI noise level by subtracting one of the two power values measured by the first and second power meters 241 and 242 by the other power value. Alternatively, the signal processor 250 can be implemented so as to measure OBI noise level by selecting the larger or smaller of the two power values measured by the first and second power meters 241 and 242.

The signal processor 250 can be implemented in such various methods. One of the various implementation methods can be selected according to the type of optical network to which the present invention is applied, or according to the system environment of the central office.

Figure 5A:
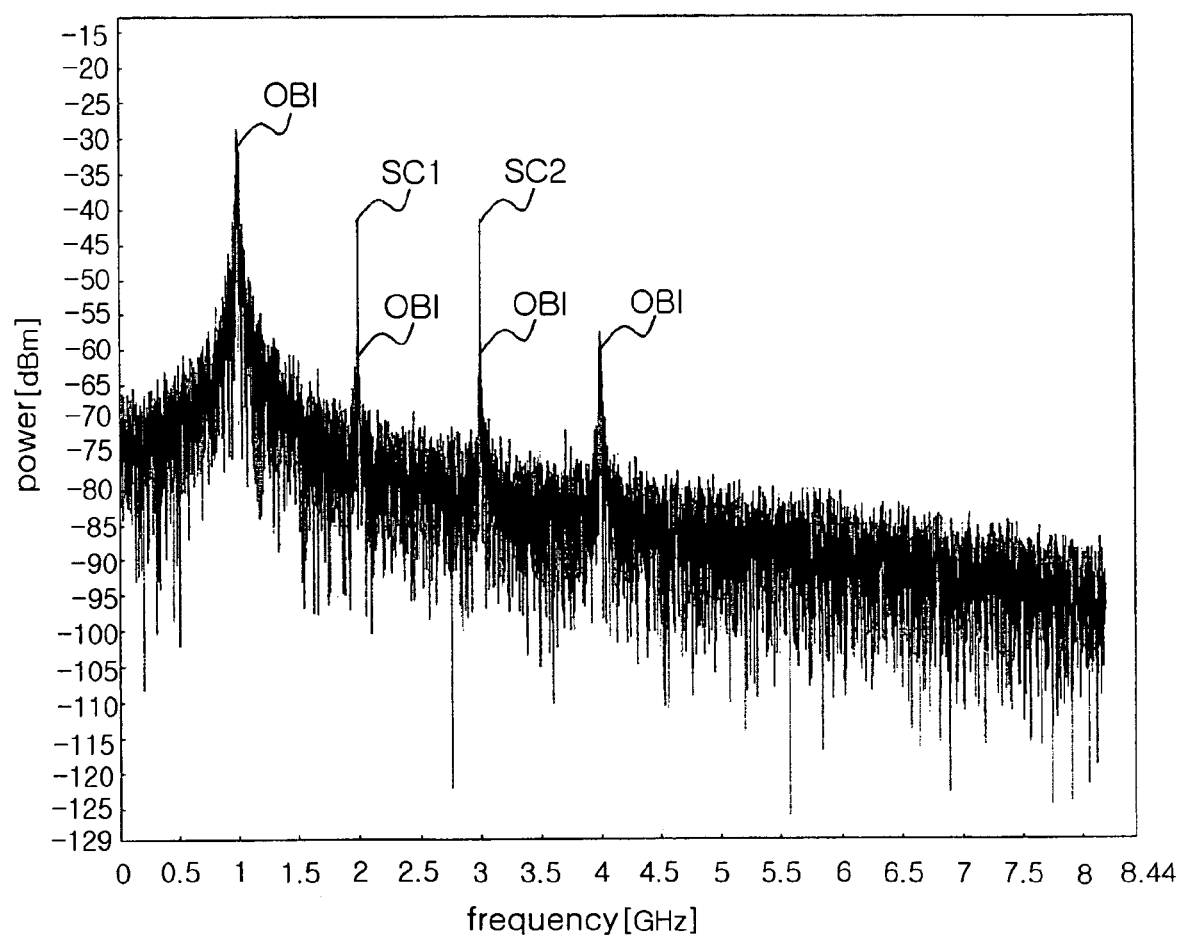
FIGS. 5a and 5b are graphs showing OBI noise in a Subcarrier Multiple Access (SCMA) optical network.
Figure 5B:
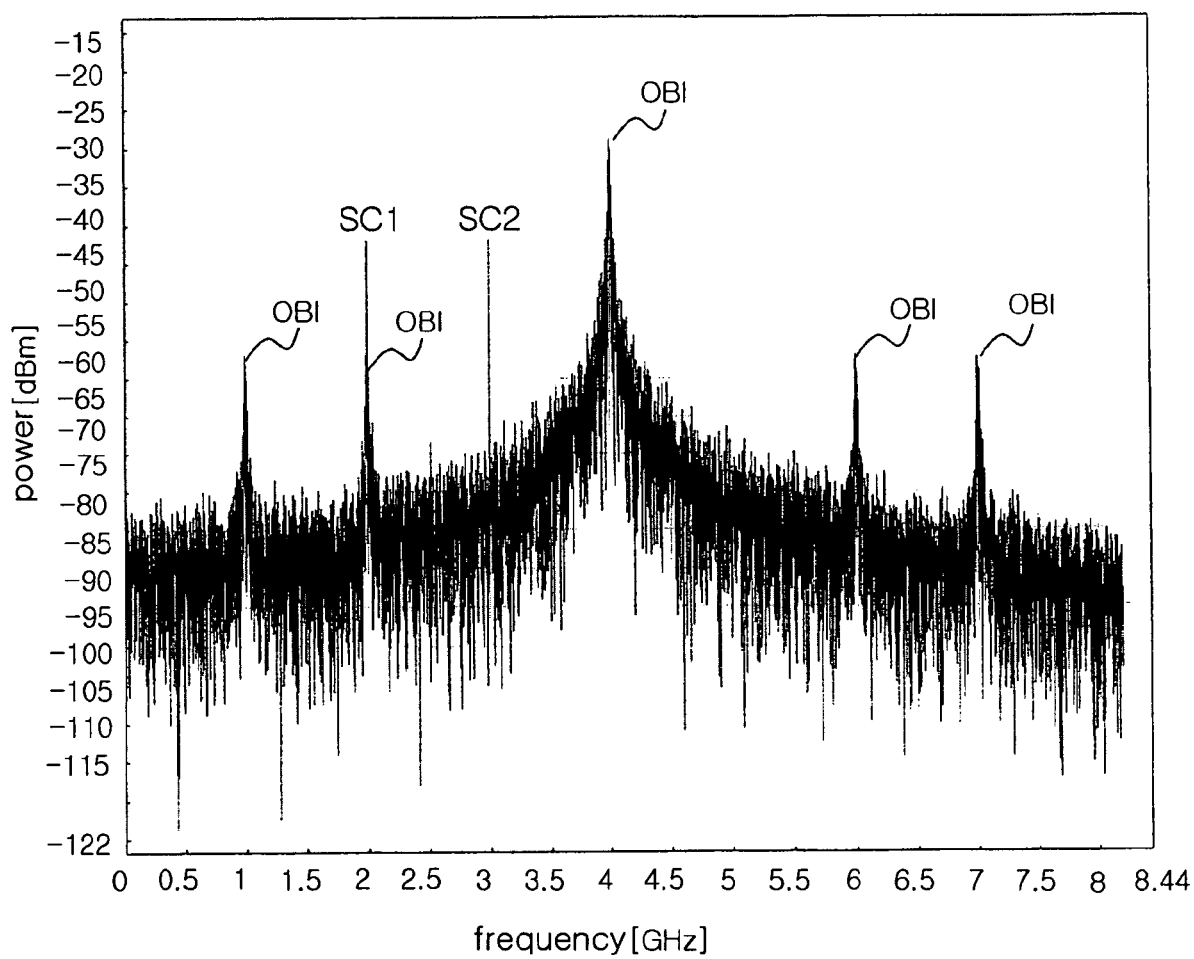

FIGS. 5a and 5b are graphs showing OBI noise in an SCMA optical network.

FIG. 5a shows an output signal spectrum of the optical receiver 101 in the central office 100 in the case where two received optical signals have been modulated with a modulation index of 0.1 using two subcarrier signals of 2 GHz and 3 GHz, respectively, and the difference between central frequencies of the two optical signals is 1 GHz.

FIG. 5b shows an output signal spectrum of the optical receiver 101 in the central office 100 in the case where two received optical signals have been modulated in the same manner as in FIG. 5a and the difference between central frequencies of the two optical signals is 4 GHz.

The operation and advantages of the present invention will now be described in detail with reference to the accompanying drawings.

Referring to FIG. 4, the plurality of subscriber terminals 30-1 to 30-N are connected with the optical coupler 40 through respective ones of the plurality of first optical fibers (OF1), and the optical coupler 40 is connected with the central office 100 through the second optical fiber (OF2). The OBI noise measurement apparatus 200 according to the present invention is applied to the SCMA optical network that allows a plurality of subscriber terminals 30-1 to 30-N to share the single optical fiber (OF2). In particular, the OBI noise measurement apparatus 200 according to the present invention is applied to the central office 100 in the optical network. The optical network, to which the apparatus 200 according to the present invention is applied, may be a Passive Optical Network (PON).

In the case where the OBI noise measurement apparatus 200 according to the present invention is applied to the central office 100, the central office 100 includes the optical receiver 101 for converting an optical signal received through the optical fiber (OF2) into an electrical signal. The OBI noise measurement apparatus 200 according to the present invention measures OBI noise using a signal output from the optical receiver 101. Subcarrier signals of the output signal of the optical receiver 101 are passed through the plurality of subcarrier filters 102, respectively. The subcarrier signals passed through the subcarrier filters 102 are demodulated into a plurality of output signals in the plurality of demodulators 103, respectively.

The power divider 210 according to the present invention divides the power of an output signal of the optical receiver 101 into two signals and outputs the two divided signals respectively to the first and second filters 220 and 230.

Each of the first and second filters 220 and 230 is provided to pass OBI noise in a specified band of frequencies other than the subcarrier frequency band. The first filter 220 passes one of the two signals divided by the power divider 210 in a low band of frequencies below the subcarrier frequency band, and the second filter 230 passes the other of the two divided signals in a high band of frequencies above the subcarrier frequency band. The first and second filters 220 and 230 effectively pass only the OBI noise of the received signal that is present above and below the subcarrier band.

In the case where the OBI noise measurement apparatus according to the present invention is applied to a CATV system, the first filter 220 can be set to pass a band of frequencies of 50 MHz or less, and the second filter 230 can be set to pass a band of frequencies of 900 MHz or more since subcarriers of the CATV system are in a band of about 50 MHz to 900 MHz.

OBI noise occurs at a frequency corresponding to the difference between the central frequencies of two received optical signals. The difference between the central frequencies of the two optical signals may be present below or above the subcarrier band according to the system or environment employed. In order to effectively measure such OBI noise, the OBI noise measurement apparatus according to the present invention employs two filters that pass a low band of frequencies below the subcarrier band and a high band of frequencies above the subcarrier band, respectively.

Detailed examples of the first and second filters 220 and 230 are described below. If a Low Pass Filter (LPF) is applied to the first filter 220, the first filter 220 passes a low band of frequencies below the subcarrier frequency band, and if a Band Pass Filter (BPF) is applied to the first filter 220, the first filter 220 passes a predetermined band within the low band of frequencies below the subcarrier frequency band.

Similarly, if a High Pass Filter (HPF) is applied to the second filter 230, the second filter 230 passes a high band of frequencies above the subcarrier frequency band, and if a Band Pass Filter (BPF) is applied to the second filter 230, the second filter 230 passes a predetermined band within the high band of frequencies above the subcarrier frequency band.

The power measurement unit 240 according to the present invention measures the power of each OBI noise signal passed through the first and second filters 220 and 230. For example, if the power measurement unit 240 includes the first and second power meters 241 and 242 as shown in FIG. 4, the first power meter 241 measures the power of each OBI noise signal passed through the first filter 220, and the second power meter 242 measures the power of each OBI noise signal passed through the second filter 230.

On the other hand, if the OBI noise measurement apparatus according to the present invention further includes the signal processor 250, the signal processor 250 measures OBI noise level on the basis of power values detected by the power measurement unit 240. For example, the signal processor 250 can measure OBI noise level by adding power values measured by the first and second power meters 241 and 242.

Alternatively, the signal processor 250 can measure OBI noise level by subtracting one of the two power values measured by the first and second power meters 241 and 242 by the other power value.

Alternatively, the signal processor 250 can measure OBI noise level by selecting the larger or smaller of the two power values measured by the first and second power meters 241 and 242.

As described above, FIGS. 5a and 5b are graphs showing OBI noise in an SCMA optical network. Specifically, the graphs of FIGS. 5a and 5b illustrate simulation results of the output spectrum of an optical receiver according to frequencies, at which OBI noise occurs, when the optical receiver receives two optical signals. A simulation program called "VPItransmission Maker CATV ver 5.2" is used in this simulation.

More specifically, FIG. 5a shows an output signal spectrum of the optical receiver 101 in the central office 100 in the case where two received optical signals have been modulated with a modulation index of 0.1 using two subcarrier signals (SC1 and SC2) of 2 GHz and 3 GHz, respectively, and the difference between central frequencies of the two optical signals is 1 GHz.

In the spectrum of FIG. 5a, the two optical signals have been modulated with a relatively low modulation index of 0.1, so that the highest optical power of each received optical signal is located at the central frequency and other optical power is present at ±2 GHz and ±3 GHz with respect to the central frequency. As can be seen from the spectrum of FIG. 5a, Optical Beat Interference (OBI) noise has occurred at 1 GHz, 2 GHz, 3 GHz and 4 GHz due to beating between the two optical signals, and the highest OBI noise has occurred at 1 GHz, which corresponds to the difference between the central frequencies of the two optical signals. The subcarrier signal (SC1) of 2 GHz and the subcarrier signal (SC2) of 3 GHz, which have been used to modulate the two optical signals, are also present in the output signal spectrum of the optical receiver 101.

In the simulation, the power of noise passed through the first and second filters 220 and 230 was measured by the power measurement unit 240 according to the present invention with the first filter 220 being set to pass a 100 MHz band of frequencies centered at 1550 MHz and the second filter being set to pass a 100 MHz band of frequencies centered at 3450 MHz. The power of noise passed through the first filter 220, measured by the first power meter 241, was about −50.9 dBm, and the power of noise passed through the second filter 230, measured by the second power meter 242, was about −61.9 dBm.

The measured power of OBI noise is about −61.9 dBm if only one of the two filters, whose central frequency is set to about 3450 MHz, is used to measure the power of OBI noise as in the conventional OBI noise measurement apparatus.

On the other hand, the measured power of OBI noise is about −50.9 dBm if both the first and second filters 220 and 230 are used to measure the power of OBI noise according to the present invention.

Accordingly, the OBI noise measurement apparatus according to the present invention not only can quickly and correctly measure the power of OBI noise, but also allows light source control to be performed rapidly thereafter].

FIG. 5b shows an output signal spectrum of the optical receiver 101 in the central office 100 in the case where two received optical signals have been modulated in the same manner as in FIG. 5a and the difference between central frequencies of the two optical signals is 4 GHz.

In the same manner as described above with reference to FIG. 5a, the two optical signals have been modulated with a relatively low modulation index of 0.1, so that the highest optical power of each received optical signal is located at the central frequency and other optical power is present at ±2 GHz and ±3 GHz with respect to the central frequency. As can be seen from the spectrum of FIG. 5a, Optical Beat Interference (OBI) noise has occurred at 1 GHz, 2 GHz, 4 GHz, 6 GHz, and 7 GHz due to beating between the two optical signals, and the highest OBI noise has occurred at 4 GHz, which corresponds to the difference between the central frequencies of the two optical signals.

The subcarrier signal (SC1) of 2 GHz and the subcarrier signal (SC2) of 3 GHz, which have been used to modulate the two optical signals, are also present in the output signal spectrum of the optical receiver 101.

In this simulation, the power of noise passed through the first filter 220, measured by the first power meter 241, was about −61.9 dBm, and the power of noise passed through the second filter 230, measured by the second power meter 242, was about −50.9 dBm.

The measured power of OBI noise is about −61.9 dBm if only one of the two filters, whose central frequency is set to about 1550 MHz, is used to measure the power of OBI noise as in the conventional OBI noise measurement apparatus.

On the other hand, the measured power of OBI noise is about −50.9 dBm if both the first and second filters 220 and 230 are used to measure the power of OBI noise according to the present invention.

As described above, the OBI noise measurement apparatus according to the present invention not only can quickly and correctly measure the power of OBI noise, but also allows light source control to be performed rapidly thereafter.

As apparent from the above description, the present invention provides an apparatus for measuring Optical Beat Interference (OBI) noise in a Central Office (CO) in a Subcarrier Multiple Access (SCMA) optical network, wherein OBI noise in a signal output from an optical receiver included in the Central Office (CO) in the SCMA optical network is measured in both a low band of frequencies below a band of subcarrier signals and a high band of frequencies above the band of subcarrier signals, thereby making it possible to quickly and correctly detect the occurrence of OBI noise and quickly and correctly measure the level of the OBI noise, regardless of which band the OBI noise occurs in.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for measuring Optical Beat Interference (OBI) noise, the apparatus being applied to a central office included in a Subcarrier Multiple Access (SCMA) optical network, the central office including an optical receiver for converting an optical signal received through an optical fiber into an electrical signal, the apparatus comprising:

a power divider for dividing the power of a signal output from the optical receiver into two signals;

a first filter for passing one of the two signals divided by the power divider in a low band of frequencies below a band of subcarrier signals;

a second filter for passing the other of the two signals divided by the power divider in a high band of frequencies above the band of subcarrier signals;

a power measurement unit for measuring power of each signal passed through the first and second filters; and a signal processor for measuring OBI noise level based on power values measured by the power measurement unit, wherein the signal processor measures OBI noise level by selecting the larger or smaller of two power values measured respectively by the first and second power meters.

2. The apparatus according to claim 1, wherein the first filter includes at least one of a Band Pass Filter (BPF) and a Low Pass Filter (LPF).

3. The apparatus according to claim 1, wherein the second filter includes at least one of a Band Pass Filter (BPF) and a High Pass Filter (HPF).

4. The apparatus according to claim 1, wherein the power measurement unit includes:

a first power meter for measuring power of each signal passed through the first filter; and a second power meter for measuring power of each signal passed through the second filter.

5. The apparatus according to claim 4, wherein the signal processor measures OBI noise level by adding two power values measured respectively by the first and second power meters.

6. The apparatus according to claim 4, wherein the signal processor measures OBI noise level by subtracting a power value measured by one of the first and second power meters by a power value measured by the other thereof.

* * * * *